(12) United States Patent
Jin

(10) Patent No.: US 10,974,411 B2
(45) Date of Patent: Apr. 13, 2021

(54) FOOD CUTTING DEVICE

(71) Applicant: NINGBO JIN SHUN HOUSEWARE CO., LTD., Zhejiang (CN)

(72) Inventor: Jianjun Jin, Ningbo (CN)

(73) Assignee: NINGBO JIN SHUN HOUSEWARE CO., LTD., Ningbo (CN)

( * ) Notice: Subject to any disclaimer, the term of this patent is extended or adjusted under 35 U.S.C. 154(b) by 64 days.

(21) Appl. No.: 16/413,759

(22) Filed: May 16, 2019

(65) Prior Publication Data

US 2020/0047368 A1 Feb. 13, 2020

(30) Foreign Application Priority Data

Aug. 10, 2018 (CN) .......................... 201810909085.3

(51) Int. Cl.
*B62D 9/00* (2006.01)
*B26D 1/06* (2006.01)
(Continued)

(52) U.S. Cl.
CPC ................ *B26D 9/00* (2013.01); *A47J 47/00* (2013.01); *B26D 1/06* (2013.01); *B26D 5/10* (2013.01);
(Continued)

(58) Field of Classification Search
CPC ........ B26D 9/00; B26D 2210/02; B26D 3/26; B26D 2001/0053; B26D 3/20; B26D 7/065; B26D 2003/285; B26D 2003/286; B26D 2003/287; B26D 2003/288; B26D 3/283; B26D 7/2628; B26D 5/10; B26D 1/06; B26D 2007/0018; B26D 7/0641; B26D 7/1818; Y10T 83/6492; Y10T 83/6572; Y10T 83/8821; A47J 47/00
See application file for complete search history.

(56) References Cited

U.S. PATENT DOCUMENTS

| 291,305 A | * | 1/1884 | Dames | .................. B26D 3/283 |
| | | | | 83/865 |
| 1,358,020 A | * | 11/1920 | Rosinsky | ................. B26D 3/18 |
| | | | | 83/145 |

(Continued)

FOREIGN PATENT DOCUMENTS

| CN | 204195799 U | 3/2015 |
| CN | 103878802 B | 8/2017 |
| CN | 207206492 U | 4/2018 |

*Primary Examiner* — Jonathan G Riley
(74) *Attorney, Agent, or Firm* — Cooper Legal Group, LLC

(57) ABSTRACT

A food cutting device includes a housing and a cutting mechanism, wherein a feeding port is arranged at one side of the housing, and a discharging port is arranged at the other side of the housing; the cutting mechanism includes a cutting portion and a push-pull portion for controlling reciprocating movement of the cutting portion; the cutting portion includes a sliding component, a first cutter and a plurality of second cutters; the sliding component is slidably connected with the housing; both the first cutter and the second cutters are located on the side of the sliding component close to the feeding port, and are detachably connected with the sliding component; and the first cutter is parallel to a sliding direction of the sliding component, and is not parallel to the second cutters. The food cutting device can meet various cutting requirements of people and is efficient.

8 Claims, 8 Drawing Sheets

(51) Int. Cl.
    *B26D 5/10*     (2006.01)
    *B26D 7/00*     (2006.01)
    *B26D 9/00*     (2006.01)
    *A47J 47/00*     (2006.01)

(52) U.S. Cl.
    CPC .. *B26D 2007/0018* (2013.01); *B26D 2210/02* (2013.01)

(56) References Cited

U.S. PATENT DOCUMENTS

| | | | | |
|---|---|---|---|---|
| 2,103,537 A * | 12/1937 | Killman | B26D 3/283 | 83/123 |
| 2,473,165 A * | 6/1949 | McKinney | B26D 3/18 | 83/167 |
| 4,212,431 A * | 7/1980 | Doyel | A47J 43/25 | 241/100 |
| 4,928,893 A * | 5/1990 | Prindle | A47J 43/25 | 241/95 |
| 5,445,332 A | 8/1995 | Shimizu et al. | | |
| 5,745,999 A * | 5/1998 | Zirkiev | A47J 43/25 | 30/278 |
| 5,765,472 A * | 6/1998 | Kim | B26D 3/283 | 83/167 |
| 8,181,560 B2 * | 5/2012 | Hauser | B26D 3/283 | 83/858 |
| 9,333,661 B1 * | 5/2016 | Nguyen | B26B 29/063 | |
| D776,989 S * | 1/2017 | Wong | D7/678 | |
| 10,434,674 B2 * | 10/2019 | Bagley | B26D 3/283 | |
| 2002/0174754 A1 * | 11/2002 | Vincent | B26D 3/283 | 83/247 |
| 2004/0216579 A1 * | 11/2004 | Zeder | B26D 3/283 | 83/698.11 |
| 2004/0231482 A1 * | 11/2004 | Boilen | B26D 3/283 | 83/425.3 |
| 2006/0081108 A1 * | 4/2006 | de Buyer | B26D 3/283 | 83/703 |
| 2006/0283299 A1 * | 12/2006 | Mellen | B26D 7/00 | 83/401 |
| 2007/0089577 A1 * | 4/2007 | Wong | B26D 3/283 | 83/13 |
| 2008/0156204 A1 * | 7/2008 | Cohen | B26D 7/00 | 99/492 |
| 2009/0255391 A1 * | 10/2009 | Hood | B26D 3/283 | 83/648 |
| 2010/0180778 A1 * | 7/2010 | Walker | B26D 3/28 | 99/537 |
| 2010/0326291 A1 * | 12/2010 | Wong | B26D 3/283 | 99/537 |
| 2011/0067545 A1 * | 3/2011 | Robbins | B26D 3/283 | 83/698.71 |
| 2011/0094111 A1 * | 4/2011 | Hauser | B26D 3/283 | 30/286 |
| 2011/0132161 A1 * | 6/2011 | Robbins | B26D 1/03 | 83/13 |
| 2012/0180612 A1 * | 7/2012 | Holcomb | B26D 5/10 | 83/613 |
| 2012/0198980 A1 * | 8/2012 | Bagley | B26D 3/283 | 83/699.51 |
| 2012/0227564 A1 * | 9/2012 | Fung | B26D 3/283 | 83/856 |
| 2013/0087033 A1 * | 4/2013 | Tetreault | B26D 3/26 | 83/440 |
| 2014/0047964 A1 * | 2/2014 | Zhao | B26D 3/26 | 83/167 |
| 2014/0165408 A1 * | 6/2014 | Schillheim | A47J 17/02 | 30/151 |
| 2014/0331844 A1 * | 11/2014 | Stewart | B26D 3/283 | 83/699.51 |
| 2014/0366699 A1 * | 12/2014 | Wong | B26D 3/283 | 83/698.11 |
| 2015/0209973 A1 * | 7/2015 | Hauser | B26D 7/2628 | 83/856 |
| 2017/0021515 A1 * | 1/2017 | Colburn | B26D 7/2628 | |
| 2017/0066151 A1 * | 3/2017 | Yamamoto | B26D 3/283 | |
| 2017/0106551 A1 * | 4/2017 | Bernede | B26D 3/26 | |
| 2017/0348868 A1 * | 12/2017 | Bagley | B26D 3/283 | |
| 2018/0162003 A1 * | 6/2018 | Plichon | B26D 3/26 | |
| 2020/0070377 A1 * | 3/2020 | Jaureguibeitia Olalde | B26D 1/18 | |

\* cited by examiner

FOOD CUTTING DEVICE

TECHNICAL FIELD

The present Invention relates to the field of food processing devices, and more particularly, to a food cutting device.

BACKGROUND

An important part in processing of food such as meat and vegetables is to cut food raw materials into desired shapes. At present, food is cut mainly by hand or through a food cutting machine in this industry. However, the efficiency of manual cutting is too low, which is not conducive to large-scale production. An existing food cutting machine is complex in structure, relatively complicated in operation, and higher in manufacture cost. In addition, the existing food cutting machine can only cut the food into slices or shreds because of the single function.

SUMMARY

An object the present Invention is to provide a food cutting device which can meet various cutting requirements of people and which is efficient.

In order to achieve the above object, the basic solution of the present Invention is as follows. A food cutting device comprises a housing and a cutting mechanism; a feeding port is arranged at one side of the housing, and a discharging port is arranged at the other side of the housing; the cutting mechanism comprises a cutting portion and a push-pull portion for controlling reciprocating movement of the cutting portion; the cutting portion comprises a sliding component, a first cutter and a plurality of second cutters; the sliding component is slidably connected with the housing; both the first cutter and the second cutters are located on the side of the sliding component close to the feeding port, and are detachably connected with the sliding component; and the first cutter is parallel to a sliding direction of the sliding component, and is not parallel to the second cutters.

A working principle of the present solution of the present Invention is as follows. According to the present solution, food to be cut is placed in the feeding port, and then the cutting portion is controlled by the push-pull portion to reciprocate so as to cut the food. During the reciprocating movement of the cutting portion, the first cutter cuts the food into slices, and the second cutters cuts the sliced food into shreds.

The beneficial effects of the solution are as follows. 1. In the present solution, the first cutter and the second cutters are provided; and the first cutter is parallel to the sliding direction of the sliding component, so that food can be cut into slices in a process that the push-pull portion drives the sliding component to reciprocate. 2. The second cutters are not parallel to the first cutter, so that the second cutters can cut the sliced food into shreds during the reciprocating movement process. 3. As the first cutter and the second cutters are detachably connected with the sliding component, on one hand, the first cutter and the second cutter are easy to replace and clean; and on the other hand, the first cutter or the second cutters can be removed according to use requirements to cut the food into slices or shreds, thereby realizing multiple functions. 4. The cutting device provided by the present Invention is simple in structure and light in weight, and can realize cutting through the reciprocating movement of the sliding component driven by the push-pull portion, so that the operation is simple and convenient, and the cutting efficiency is high.

Further, a plurality of parallel ridges is arranged on the inner wall of the housing; sliding channels are arranged on the side of the sliding component close to the housing; and the ridges slidably cooperate with the sliding channels. The ridges can push out the cut food; and the ridges and the sliding channel are slidably cooperated to guide the sliding of the ridges along the housing, so that the food can be effectively push out to prevent the cut food from blocking the sliding channel or sticking on the housing.

Further, the food cutting device further comprises a first compression spring; a slideway is arranged on the inner wall at the lateral side of the housing; a protrusion is arranged at the lateral side of the sliding component; a sliding hole is formed in the protrusion; the first compression spring sleeves the slideway; the slideway passes through the sliding hole which slidably cooperates with the slideway; and the two ends of the first compression spring are fixedly connected with the protrusion and the bottom wall of the housing, respectively. The sliding component slides along the slideway; and the slideway and the sliding hole are cooperated to guide the sliding component. When the sliding component slides in a direction toward the housing, the first compression spring is compressed to store energy; and then the sliding component slides back under the action of the first compression spring. The operation is convenient, and thus labor is saved.

Further, the push-pull portion comprises a push-pull rod; a first through hole is formed in the upper end of the housing; the push-pull rod passes through the first through hole to be rotatably connected with the sliding component, and slidably cooperates with the first through hole; a sliding chute is formed in the lateral side of the push-pull rod; a flange is arranged at the first through hole of the housing, and slidably cooperates with the sliding chute; a limiting groove is formed in the upper part of the sliding chute, and is communicated with the sliding chute; and the flange can enter the limiting groove. By driving the push-pull rod to slide along the through hole, the sliding component is driven to reciprocate, so that the food is cut; and the sliding chute and the flange cooperate to realize a guiding effect. When the cutting is completed, the push-pull rod is driven in a direction toward the housing, so that the limiting groove and the flange are located in the same horizontal plane; and then, the push-pull rod is rotated to allow the flange to enter the limiting groove, so that the push-pull rod can be fixed to reduce a space occupied by the food cutting device. Thus, the food cutting device is convenient to move and store.

Further, the food cutting device further comprises a material placing portion comprising a material placing cylinder and a compaction component; one end of the material placing cylinder is detachably connected with the feeding port; and the compaction component is matched with the material placing cylinder in shape, and slidably cooperates with the material placing cylinder. The food to be cut is placed into the feeding port through the material placing portion which plays fixing and guiding roles on the food to be cut, so that the food to be cut can move in a direction toward the feeding port under the action of gravity. In addition, a force can be applied to the food to be cut through the compaction component to facilitate cutting of lighter or smaller food.

Further, the second cutters comprise a first cutting group and a second cutting group; the first cutting group comprises a plurality of first cutting blades; the second cutting group comprises a plurality of second cutting blades; and the first cutting blades and the second cutting blades are alternately arranged. When only the first cutting group or the second cutting group is arranged, cut shreds are relatively thicker; and when both the first cutting group and the second cutting group are arranged, the cut shreds are relatively thinner. Thus, the thickness of the shredded food can be changed.

Further, the food cutting device further comprises a sliding block; a sliding groove is formed in each of the two sides of the sliding component, and is perpendicular to the slideway; the sliding block slidably cooperates with the sliding component through the sliding grooves; the first cutter is connected with the sliding component; and the second cutters are connected with the sliding block. The sliding block can slide along the sliding grooves to change the distance between the sliding block and the sliding component. That is, the distance between the sliding block and the first cutter is changed, so that foods can be cut into different thicknesses of shreds.

Further, the food cutting device further comprises a second compression spring and a first threaded component; a second through hole is formed in the sliding component; a threaded hole is formed in the sliding block; the first threaded component passes through the second through hole and is in threaded fitting with the threaded hole; and the second compression spring is located between the sliding block and the sliding component. A distance between the sliding block and the sliding component can be changed by rotating the first threaded component, and the operation is convenient.

Further, the food cutting device further comprises a collecting portion for collecting the food after cutting, so that the cut food can be collected conveniently. The collecting portion is convenient to use and ensures the cleanness of the food.

Further, a strip-shaped passage is formed in the upper part of the sliding component; and the first cutting blades and the second cutting blades can pass through the passage. When it is required to use the second cutters, the first cutting blades or the second cutting blades pass through the passage to cut food. When the second cutters are not needed, the first and the second cutting blades are controlled so as not to pass through the passage. Thus, the operation is convenient.

Further, the food cutting device further comprises two support components. The two support components are located at two sides of the housing, respectively, and are hinged to the housing; and the housing is provided with a limiting plate for limit a rotation angle of each support component. When cutting, the support components are rotated until the limiting plate limits the rotation of the support components. At this time, the support components can support the housing to enable the housing to be inclined. In this way, the operation is more convenient. When cutting is not required, the support components are rotated in the opposite direction to be parallel to the lateral side of the housing, so that the food cutting device is convenient to store, and a space occupied by the food cutting device is reduced.

Further, a connecting rod is arranged at the lower parts of the two support components. With the connecting rod, the support strength of the support components is improved, so that the food cutting device is more stable.

Further, the collecting portion comprises a collecting box; a notch is formed in one side of the collecting box; and the connecting rod can be clamped into the notch. Through the cooperation of the notch and the collecting box, the collecting box can be initially fixed to avoid the movement of the collecting box during the cutting process.

DETAILED DESCRIPTION

Figure 1:
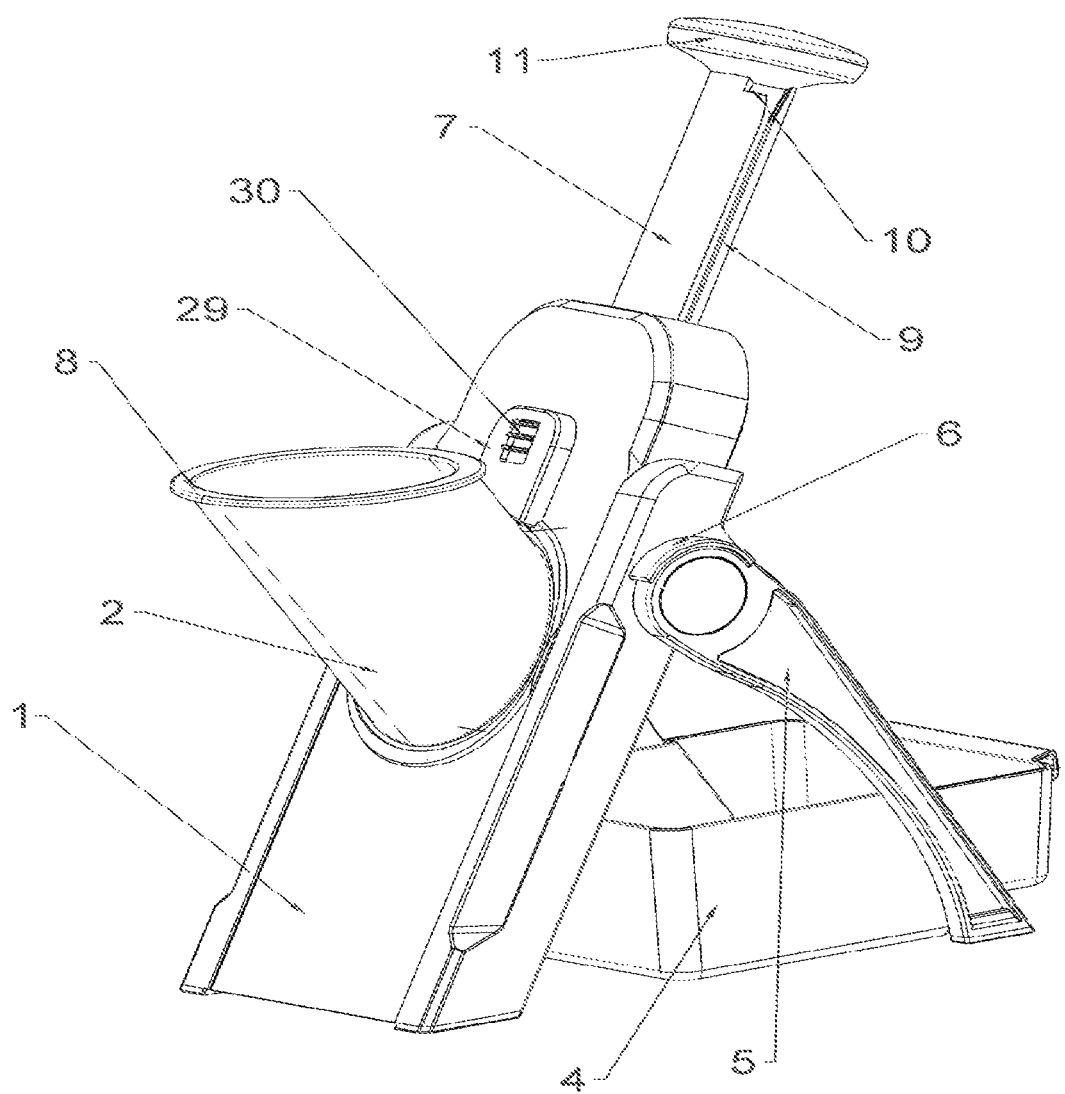
FIG. 1 is a stereoscopic view of a food cutting device of the present Invention.

The present Invention will be further described in detail below with reference to the specific embodiments.

Reference numerals in the drawings of the description are as follows: 1, housing; 2, material placing cylinder; 4, collecting box; 5, support frame; 6, limiting plate; 7, push-pull rod; 8, compaction component; 9, sliding chute; 10, limiting groove; 11, handle; 12, slideway; 13, sliding component; 14, first cutter; 15, first cutting blade; 16, second cutting blade; 17, sliding groove; 18, protrusion; 19, first threaded knob; 20, sliding block; 21, feeding port; 22, ridge; 23, first through hole; 24, flange; 25, notch; 26, connecting rod; 27, compaction plate; 28, mesh hole; 29, cover; 30, toggling piece; 31, sliding channel; 32, passage; 33, second threaded knob; 34, first cutter holder; 35, threaded through hole; and 36, second cutter holder.

Figure 2:
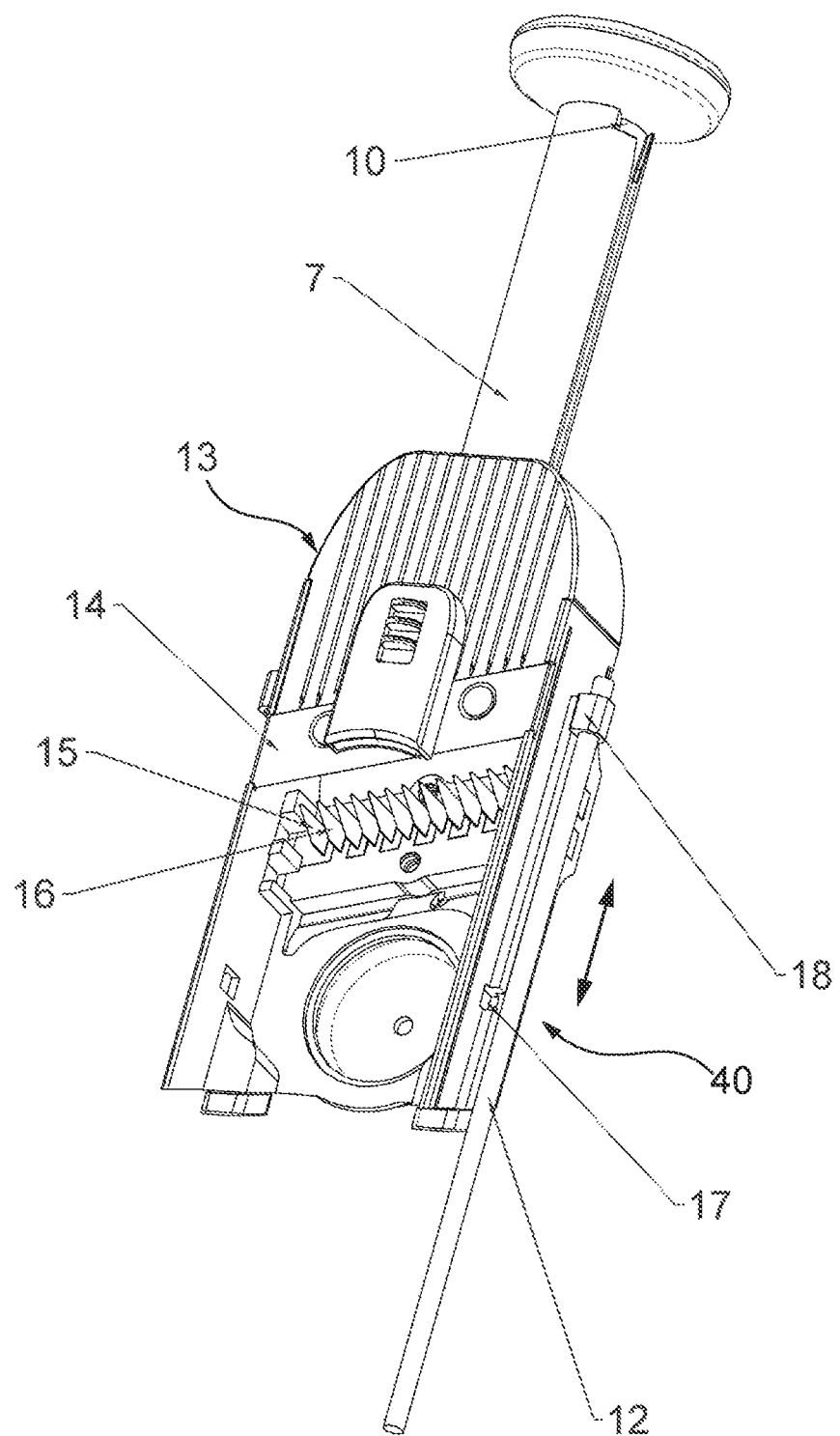
FIG. 2 is a schematic view showing a connection of a sliding component and a slideway in the food cutting device of the present Invention.
Figure 3:
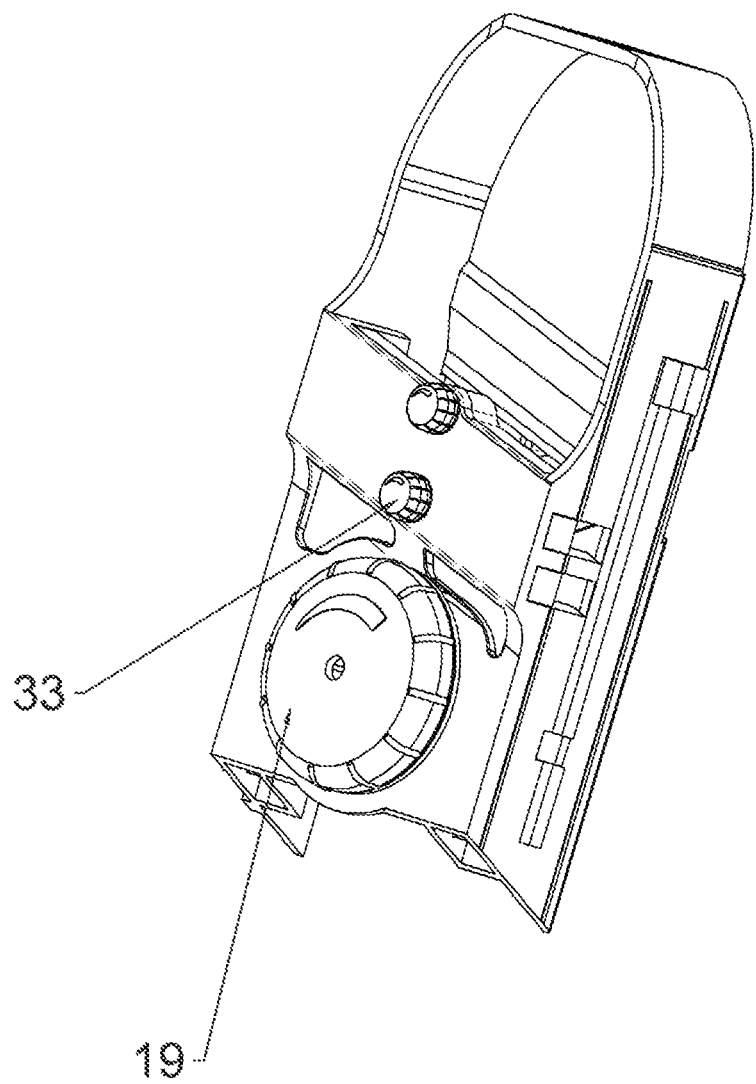
FIG. 3 is a perspective view of the sliding component.
Figure 4:
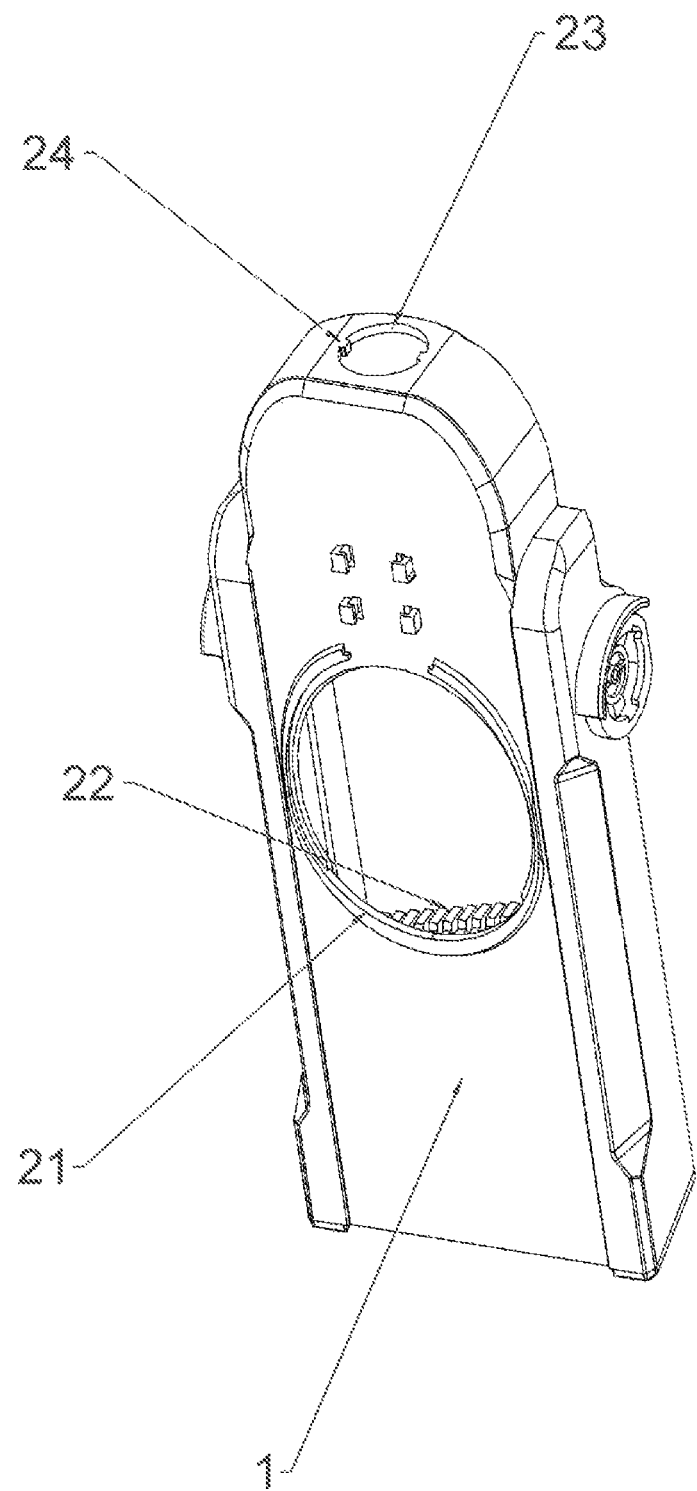
FIG. 4 is a schematically structural view of a housing.

Embodiments are basically as shown in FIGS. 1 to 3. A food cutting device comprises a housing 1, a first compression spring and a material placing cylinder 2. In the present solution, the food cutting device further comprises a cutting mechanism. A feeding port 21 is arranged at one side of the housing 1; and a discharging port is arranged at the other side of the housing 1. A collecting portion for collecting food after cutting is placed below the discharging port, and specifically, the collecting portion is a collecting box 4. The cutting mechanism comprises a cutting portion and a push-pull portion for controlling reciprocating movement of the cutting portion. The push-pull portion comprises a push-pull rod 7; and a handle 11 is arranged at the end of the push-pull rod 7. As shown in FIG. 4, a first through hole 23 is formed in the upper end of the housing 1; the push-pull rod 7 passes through the first through hole 23 to be rotatably connected with the sliding component 13, and slidably cooperates with the first through hole 23. A sliding chute 9 is formed in the lateral side of the push-pull rod 7; a flange 24 is arranged at the first through hole 23 of the housing 1, and slidably cooperates with the sliding chute 9; a limiting groove 10 is formed in the upper part of the sliding chute 9, and is communicated with the sliding chute 9; and the flange 24 can enter the limiting groove 10.

The cutting portion comprises a sliding component 13, a first cutter 14, second cutters, and a sliding block 20. A slideway 12 is arranged on the inner wall at the lateral side of the housing 1; a protrusion 18 is arranged at the lateral side of the sliding component 13; a sliding hole is formed in the protrusion 18; the first compression spring (not shown in the Figs.) sleeves the slideway 12; the slideway 12 passes through the sliding hole which slidably cooperates with the slideway 12; and the two ends of the first compression spring are fixedly connected with the protrusion 18 and the bottom wall of the housing 1, respectively. Although the figures do not show the first compression spring, reference number 40 in FIG. 2 shows where the first compression spring would go. A sliding groove 17 is formed in each of the two sides of the sliding component 13, and is perpendicular to the slideway 12; the sliding block 20 slidably cooperates with the sliding component 13 through the sliding grooves 17; and the first cutter 14 is connected with the sliding block 20. A plurality of passages 32 is formed in the upper part of the sliding block 20. A protrusion 20*a* on the sliding block 20 (FIG. 6) can be disposed in and slide along the sliding grooves 17 to change the distance between the sliding block 20 and the sliding component 13. That is, the distance between the feeding port and the first cutter 14 is changed, so that food can be cut into different thicknesses of slices.

Figure 8:
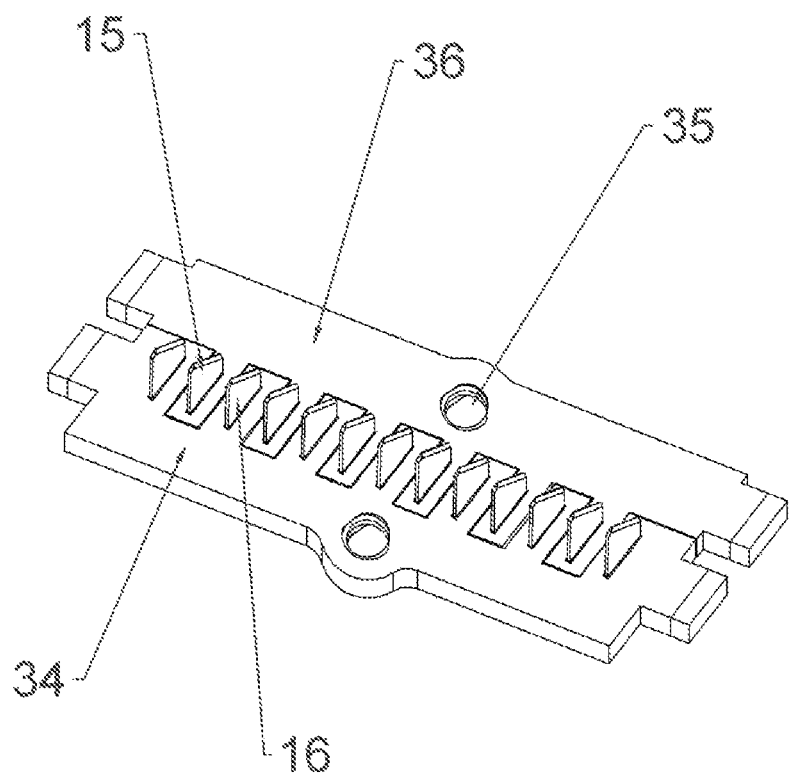
FIG. 8 is a schematically structural view of a second cutter.

As shown in FIG. 8, the second cutters comprise a first cutting group and a second cutting group. The first cutting group comprises a first cutter holder 34, a second threaded component and a plurality of first cutting blades 15; and the second cutting group comprises a second cutter holder 36, another second threaded component and a plurality of second cutting blades 16. Specifically, the second threaded component is a threaded knob 33. The plurality of first cutting blades 15 is fixed to the first cutter holder 34; and the plurality of second cutting blades 16 is fixed to the second cutter holder 36. The first cutter holder 34 and the second cutter holder 36 can be spliced together. When the first cutter holder 34 and the second cutter holder 36 are spliced together, the first cutting blades 15 and the second cutting blades 16 are alternately arranged. Both the first cutting blades 15 and the second cutting blades 16 can pass through the passages 32. Both the first cutter holder 34 and the second cutter holder 36 slidably cooperate with the sliding component, wherein a sliding direction is close to or away from the passages. Each of the first cutter holder 34 and the second cutter holder 36 is provided with a threaded through hole 35. The two threaded knobs 33 pass through the lower surface of the sliding component 13, respectively, and are rotatably connected with the sliding component 13. The two threaded knobs 33 are threadedly fit with the two threaded through holes 35, respectively. As the threaded knobs 33 are threadedly fit with the threaded holes, when the threaded knobs 33 are rotated clockwise, the first cutter holder 34 can move upward along the sliding component 13. That is, the first cutter holder 34 drives the first cutting blades 15 to move toward the feeding port. The first cutting blades 15 pass through the passages to cut food. When the threaded knobs 33 are rotated anticlockwise, the first cutting blades 15 are located below the passages 32 and cannot cut the food. Operation processes of the second cutter holder 36 and the second cutting blades 16 are the same as those of the first cutter holder 34 and the first cutting blades 15.

Figure 5:
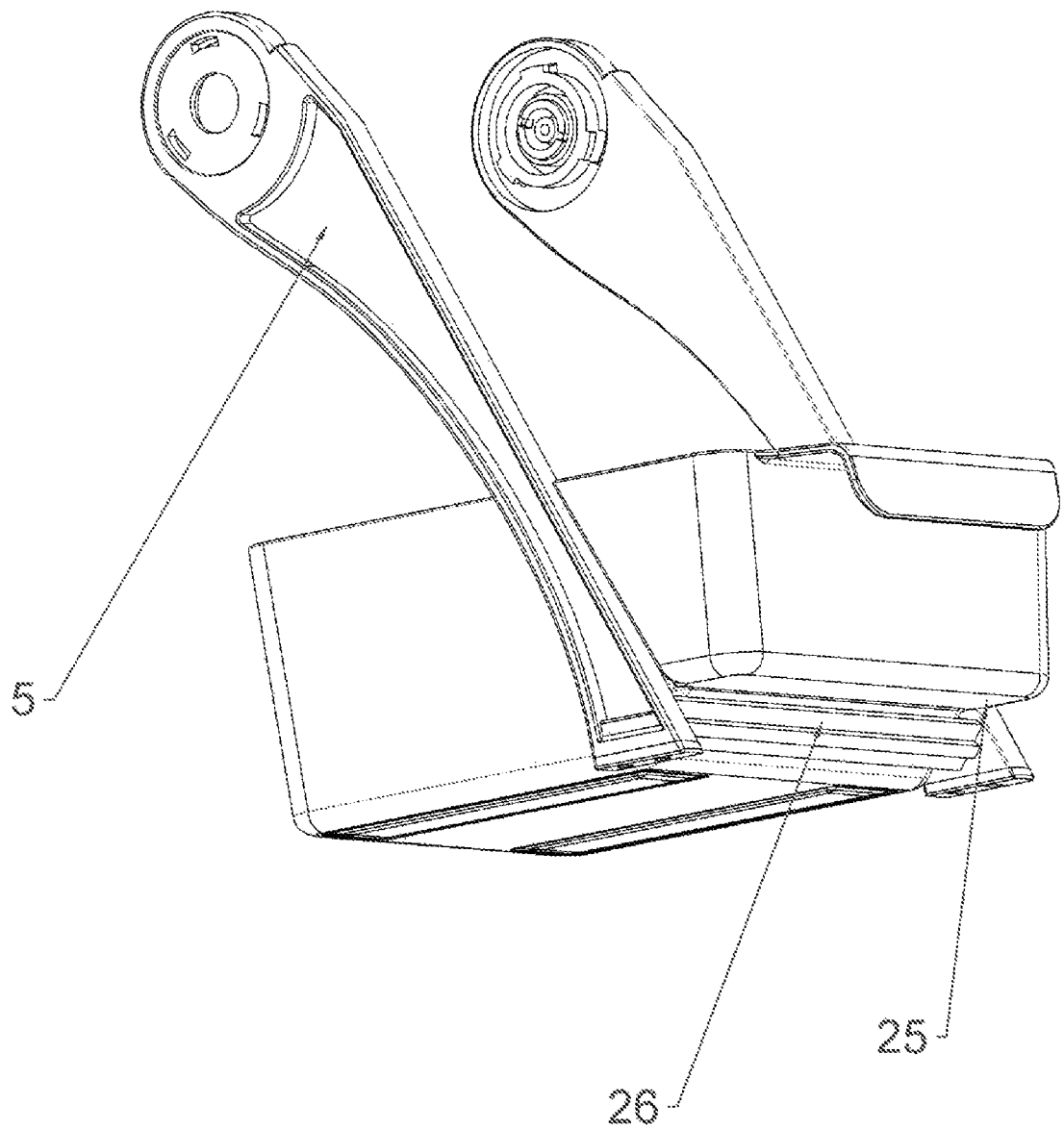
FIG. 5 is a schematic view showing a cooperation of support components and a collecting box.

A support component is arranged at each of the two sides of the housing 1. In this embodiment, the support component is a support frame 5. The two support frames 5 are located at the two sides of the housing 1, respectively, and are hinged to the housing 1. The housing 1 is provided with a limiting plate 6 for limiting a rotation angle of the support frames 5. As shown in FIG. 5, the lower ends of the two support frames 5 are connected with a connecting rod 26. A notch 25 is formed in one side of the collecting box 4; and the connecting rod 26 can be clamped into the notch 25. Through the cooperation of the notch 25 and the collecting box 4, the collecting box 4 can be initially fixed to avoid the movement of the collecting box 4 during the cutting process. When cutting, the support frames 5 are rotated until the limiting plate 6 limits the rotation of the support frames 5. At this time, the support frames can support the housing 1 to enable the housing 1 to be inclined. In this way, the operation is more convenient. When cutting is not required, the support frames 5 are reversely rotated to be parallel to the lateral side of the housing 1, so that the food cutting device is convenient to store, and a space occupied by the food cutting device is reduced.

Figure 7:
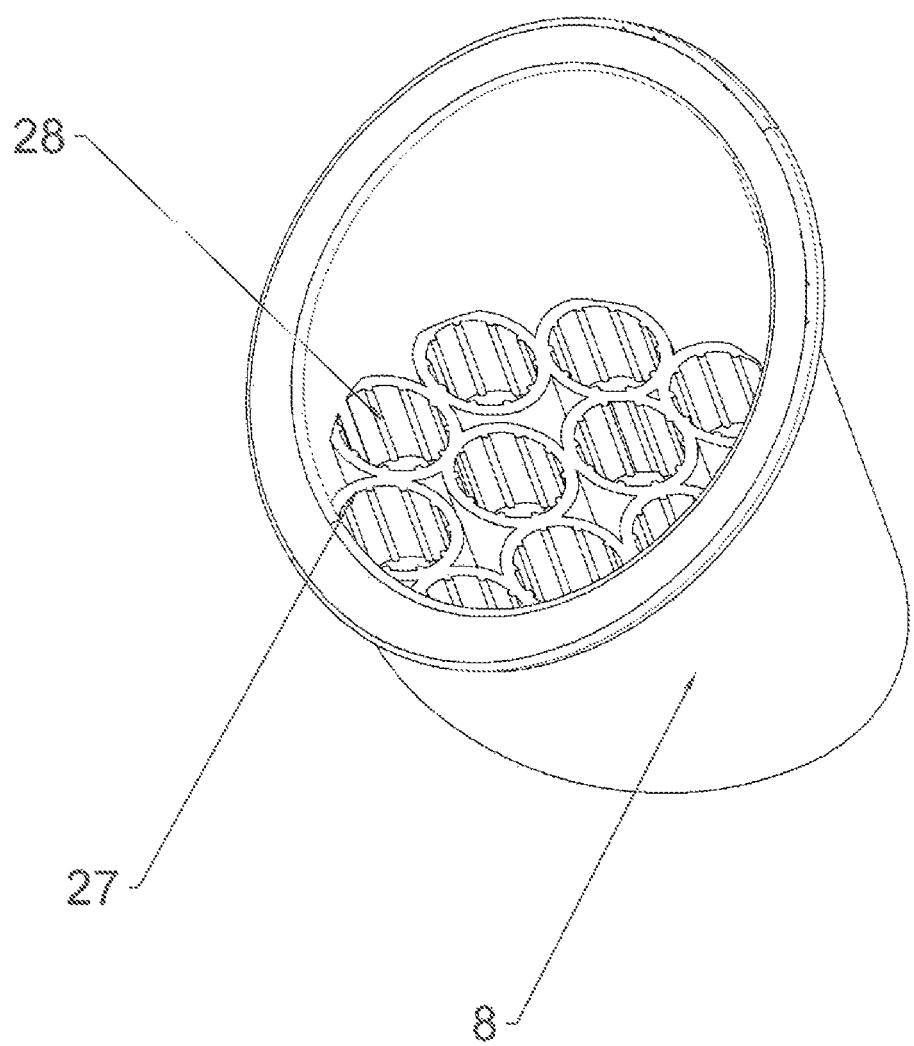
FIG. 7 is a schematically structural view of a compaction component.

The feeding port 21 is connected with a material placing portion comprising a material placing cylinder 2 and a compaction component 8. A fixing portion for fixing the material placing cylinder 2 is arranged on the housing 1, is located above the feeding port 21, and comprises a cover 29 and a clamping component slidably cooperating with the housing 1. The cover 29 covers the clamping component. The upper part of the clamping component is connected with a toggling piece 30 which extends out of the cover 29 and which slidably cooperates with the cover 29. A spring is arranged between the clamping component and the inner wall of the housing 29. The lower end of the clamping component can pass through the cover 29. A protrusion is extended at the lower end of the material placing cylinder 2; and the compaction component 8 is matched with the material placing cylinder 2 in shape, and slidably cooperates with the material placing cylinder 2. Specifically, as shown in FIG. 7, the compaction component 8 is cylindrical; and a compaction plate 27 is arranged at the lower part of the compaction component 8. A plurality of mesh holes 28 is formed in the compaction plate 27. When in use, the toggling piece 30 is toggled upward to drive the clamping component to slide upward along the housing 1; then, the lower end of the material placing cylinder 2 is placed in the feeding port; and the protrusion of the material placing cylinder 2 is opposite to the lower end of the housing 29. When the toggling piece 30 is released, the clamping component slides downward under the action of the spring. The lower end of the clamping component presses the protrusion of the material placing cylinder 2 to fix the material placing cylinder 2 at the feeding port. The food to be cut is placed in the feeding port 21 through the material placing cylinder 2 which plays fixing and guiding roles on the food to be cut, so that the food to be cut can move in a direction toward the feeding port 21 under the action of gravity. In addition, a force can be applied to the food to be cut through the compaction component 8 to facilitate cutting of lighter or smaller food.

A specific implementation process of the food cutting device is as follows. When cutting food, such as a potato which is taken as an example in the present embodiment, the potato to be cut is placed in the feeding port 21 through the material placing cylinder 2. As the housing 1 is inclined with respect to the horizontal plane, the potato can fall on a cutting opening of the housing 1 by the action of its own gravity; and then the push-pull rod 7 is rotated, so that the limiting groove 10 is not limited by the flange 24 on the housing 1. With the first compression spring, the push-pull rod 7 is pushed up and down repeatedly to slide along the through hole. The sliding component 13 slides along the slideway 12 in a direction shown by the arrow in FIG. 2, which is along the axis of the slideway 12, while the cooperation of the slideway 12 and the sliding hole can guide the sliding component 13. When the sliding component 13 slides in a direction toward the housing 1, the first compression spring is compressed to store energy, so that the sliding component 13 can slide back. The first cutter 14 and the second cutters on the sliding component 13 move along with the sliding component 13.

The first cutter 14 cuts the potato into slices, and the second cutters cut the potato slices into shreds. When it is required to cut the potato into slices, the two threaded knobs 33 are rotated reversely to enable the first cutter holder 34 and the second cutter holder 36 to move downward. Neither the first cutting blades 15 nor the second cutting blades 16 pass through the passages 32, so that only the first cutter 14 cuts the potato into slices. When it is required to cut the potato into strips, the threaded knobs 33 are rotated to enable only the first cutting blades 15 or the second cutting blades 16 to pass through the passages 32. When only the second cutting blades 16 pass through the passages 32, a distance between the adjacent second cutting blades 16 is longer. After the first cutting blades 14 cut the potato into slices, the second cutting blades 16 can cut the potato slices into strips. Of course, when only the first cutting blades 15 pass through the passages 32, the cutting principle and process are the same as those of the second cutting blades. When it is required to cut the potato into lumps, first, the first cutter 14 and the first cutting group/second cutting group cut the potato into strips; and then, the potato strips are placed in the mesh holes 28 of the compaction component 8. Neither the second cutting blades 16 nor the first cutting blades 15 pass through the passages 32, and only the first cutting blades 14 are used for cutting. The compaction component 8 is placed in the material placing cylinder 2; and the sliding component 13 is reciprocally slid through the handle to drive the first cutting blades 14 to slide, so as to cut the potato strips into lumps.

Figure 6:
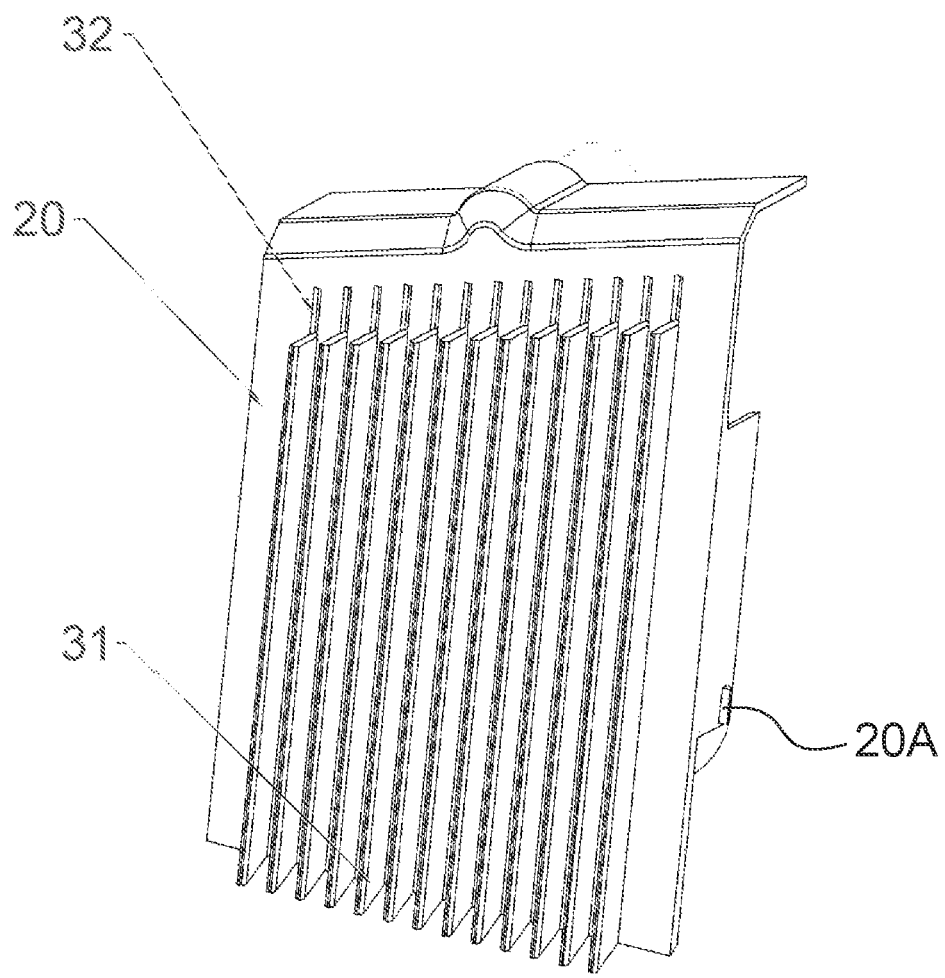
FIG. 6 is a schematic view of a sliding block.

In this solution, the food cutting device further comprises a second compression spring and a first threaded component. Specifically, the first threaded component is a threaded knob 19. A second through hole is formed in the sliding component 13; a threaded hole is formed in the sliding block 20; the threaded knob 9 passes through the second through hole and is in threaded fitting with the threaded hole; and the second compression spring is located between the sliding block 20 and the sliding component 13. A distance between the sliding block 20 and the sliding component 13 can be changed by rotating the first threaded component, and the operation is convenient. As shown in FIG. 6, a plurality of parallel ridges 22 is arranged on the inner wall of the housing; sliding channels 31 is arranged on the surface of the sliding block 20 close to the housing 1; and the sliding channel slidably cooperate with the ridges 22. The ridges 22 can push out the cut food to prevent the potatoes from sticking in the food cutting device.

The foregoings are only the embodiments of the present Invention, and the common knowledge such as specific structures and characteristics well known in the solution are not described herein. It should be noted that those skilled in the art can make various modifications and improvements without departing from the structure of the present Invention. These modifications and improvements should also be considered to be within the protection scope of the present Invention, and will not affect the implementation effect or the patent practicality of the present Invention. The protection scope of the present Invention shall be subject to the protection scope defined by the claims, and the specific embodiments and the like recorded in the description can be used to explain the contents of the claims.

The invention claimed is:
1. A food cutting device, comprising:
a housing;
a feeding port formed in one side of the housing;
a discharging port formed in an other side of the housing; and
a cutting mechanism comprising a cutting portion and a push-pull portion for controlling reciprocating movement of the cutting portion, the cutting portion comprising:
a sliding component that is slidably connected with the housing, and
a first cutter and a plurality of second cutters that are located on a side of the sliding component close to the feeding port, and are detachably connected with the sliding component, a plane of the first cutter being parallel to a sliding direction of the sliding component, and not parallel to planes of the plurality of second cutters,
wherein:
the push-pull portion comprises a push-pull rod;
a first through hole is formed in an upper end of the housing;
the push-pull rod passes through the first through hole to be rotatably connected with the sliding component, and slidably cooperates with the first through hole;
a sliding chute is formed in a lateral side of the push-pull rod;
a flange is arranged at the first through hole of the housing, and slidably cooperates with the sliding chute;
a limiting groove is formed in an upper part of the sliding chute, and is communicated with the sliding chute;
the flange is capable of entering the limiting groove;
the plurality of second cutters comprise a first cutting group and a second cutting group;
the first cutting group comprises a plurality of first cutting blades;
the second cutting group comprises a plurality of second cutting blades; and
the first cutting blades and the second cutting blades are alternately arranged.

2. The food cutting device of claim 1, wherein:
a plurality of parallel ridges is arranged on an inner wall of the housing;
a sliding channel is arranged on the side of the sliding component close to the housing; and
the ridges slidably cooperate with the sliding channel.

3. The food cutting device of claim 1, further comprising a first compression spring, wherein:
a slideway is arranged on an inner wall at the lateral side of the housing;
a protrusion is arranged at the lateral side of the sliding component;
a sliding hole is formed in the protrusion; the first compression spring sleeves the slideway;
the slideway passes through the sliding hole which slidably cooperates with the slideway; and
two ends of the first compression spring are fixedly connected with the protrusion and a bottom wall of the housing, respectively.

4. The food cutting device of claim 3, further comprising a material placing portion, wherein:
the material placing portion comprises a material placing cylinder and a compaction component;
one end of the material placing cylinder is detachably connected with the feeding port; and the compaction component is matched with the material placing cylinder in shape, and slidably cooperates with the material placing cylinder.

5. The food cutting device of claim 4, further comprising a sliding block, wherein:
   a sliding groove is formed in each of two sides of the sliding component;
   the sliding block slidably cooperates with the sliding component through the sliding grooves;
   the first cutter is connected with the sliding component; and
   the second cutters are connected with the sliding block.

6. The food cutting device of claim 5, further comprising a first threaded component that is configured to be rotated to change a distance between the sliding block and the sliding component.

7. The food cutting device of claim 6, further comprising a collecting portion capable of collecting cut food.

8. The food cutting device of claim 7, wherein a strip-shaped passage is formed in the upper part of the sliding component; and the first and second cutting blades are capable of passing through the passage.

* * * * *